(12) United States Patent
Brück et al.

(10) Patent No.: US 10,883,490 B2
(45) Date of Patent: Jan. 5, 2021

(54) METHOD FOR OPERATING A DEVICE FOR THE DOSED SUPPLY OF A LIQUID

(71) Applicant: CONTINENTAL AUTOMOTIVE GmbH, Hannover (DE)

(72) Inventors: Rolf Brück, Bergisch Gladbach (DE); Peter Bauer, Immenreuth (DE); Christian Vorsmann, Cologne (DE); Jan Hodgson, Troisdorf (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 587 days.

(21) Appl. No.: 15/553,523

(22) PCT Filed: Feb. 9, 2016

(86) PCT No.: PCT/EP2016/052703
§ 371 (c)(1),
(2) Date: Aug. 24, 2017

(87) PCT Pub. No.: WO2016/134968
PCT Pub. Date: Sep. 1, 2016

(65) Prior Publication Data
US 2018/0238323 A1  Aug. 23, 2018

(30) Foreign Application Priority Data
Feb. 26, 2015  (DE) .......... 10 2015 203 437

(51) Int. Cl.
*F04B 49/12* (2006.01)
*F04B 51/00* (2006.01)
(Continued)

(52) U.S. Cl.
CPC ............ *F04B 49/125* (2013.01); *F01N 3/208* (2013.01); *F01N 3/2066* (2013.01);
(Continued)

(58) Field of Classification Search
CPC ........ F04B 49/125; F04B 51/00; F04B 43/02; F04B 11/0008; F04B 43/14; F04B 43/12;
(Continued)

(56) References Cited

U.S. PATENT DOCUMENTS

| 5,988,998 A * | 11/1999 | Glover | F04C 5/00 |
| | | | 418/153 |
| 9,719,396 B2 * | 8/2017 | Bruck | F01N 3/2066 |

(Continued)

FOREIGN PATENT DOCUMENTS

| DE | 102011010644 | 8/2012 |
| DE | 102012107430 | 2/2014 |

(Continued)

OTHER PUBLICATIONS

Office Action dated Apr. 21, 2019 issued in Chinese Patent Application No. 201680005960.4.

*Primary Examiner* — Dominick L Plakkoottam
(74) *Attorney, Agent, or Firm* — Cozen O'Connor (57) ABSTRACT

A method for operating a device for dosed supply of a liquid, having a pump to deliver the liquid. The pump has an inlet and an outlet. An eccentric is arranged on the pump housing and a deformable diaphragm is arranged between a pump housing and the eccentric. The deformable diaphragm and the pump housing delimit a delivery path from the inlet to the outlet. The seal can be displaced along the delivery path by movement of the eccentric. A pressure sensor is connected to the outlet of the pump. A liquid is delivered by the pump. A time curve of the pressure at the outlet of the pump is monitored during delivery by the at least one pressure sensor. An angle position of the eccentric of the pump is detected using at least one characteristic feature of the time curve at the outlet.

10 Claims, 5 Drawing Sheets

(51) Int. Cl.
- F04B 43/02 (2006.01)
- F01N 3/20 (2006.01)
- F04B 11/00 (2006.01)
- F04B 43/14 (2006.01)
- F04B 49/02 (2006.01)
- F04C 5/00 (2006.01)
- F04B 43/12 (2006.01)

(52) U.S. Cl.
CPC .......... F04B 11/0008 (2013.01); F04B 43/02 (2013.01); F04B 43/12 (2013.01); F04B 43/123 (2013.01); F04B 43/14 (2013.01); F04B 49/022 (2013.01); F04B 51/00 (2013.01); F04C 5/00 (2013.01); *F01N 2610/02* (2013.01); *F01N 2610/144* (2013.01); *F01N 2610/146* (2013.01); *F01N 2610/148* (2013.01); *F01N 2610/1433* (2013.01); *F01N 2610/1453* (2013.01); *F01N 2900/1808* (2013.01); *F01N 2900/1822* (2013.01); *F04C 2210/1083* (2013.01); *Y02T 10/12* (2013.01)

(58) Field of Classification Search
CPC ...... F04B 43/123; F04B 49/022; F01N 3/208; F01N 2610/1453; F01N 2610/144; F01N 2610/02; F01N 3/2066; F01N 2610/146; F01N 2610/1433; F01N 2610/148; F01N 2900/1808; F01N 2900/1822; F04C 5/00; F04C 2210/1083; Y02T 10/24
See application file for complete search history.

(56) References Cited

U.S. PATENT DOCUMENTS

| | | | | |
|---|---|---|---|---|
| 2004/0241634 A1* | 12/2004 | Millis | ...................... | A01N 1/02 435/1.2 |
| 2011/0047972 A1* | 3/2011 | Bauer | .................... | B01D 53/90 60/274 |
| 2013/0126404 A1* | 5/2013 | Gronau | ............... | A61M 1/1037 210/97 |
| 2013/0177455 A1* | 7/2013 | Kamen | ............... | G06F 19/3418 417/313 |
| 2015/0196699 A9* | 7/2015 | Wilt | ........................ | F04B 43/02 210/646 |
| 2016/0138589 A1* | 5/2016 | Bruck | ....................... | F04C 5/00 418/129 |

FOREIGN PATENT DOCUMENTS

| | | |
|---|---|---|
| DE | 102013101412 | 8/2014 |
| DE | 102013102129 | 9/2014 |
| DE | 102013104242 | 10/2014 |
| DE | 102013104245 | 10/2014 |
| DE | 102013104250 | 10/2014 |
| WO | WO 2014/198597 | 12/2014 |

* cited by examiner

METHOD FOR OPERATING A DEVICE FOR THE DOSED SUPPLY OF A LIQUID

CROSS REFERENCE TO RELATED APPLICATIONS

This is a U.S. national stage of application No. PCT/EP2016/052703, filed on Feb. 9, 2016. Priority is claimed on German Application No. DE102015203437.2, filed Feb. 26, 2015, the content of which is incorporated here by reference.

BACKGROUND OF THE INVENTION

1. Field of the Invention

The invention relates to a method for operating a device for the dosed supply of a liquid. The device is particularly suitable for the dosed supply of liquid exhaust-gas cleaning additives for exhaust-gas cleaning by way of an SCR method. Such an exhaust-gas cleaning additive is, for example, a urea/water solution. A 32.5% strength urea/water solution for cleaning exhaust gas by way of the SCR method is available under the trade name AdBlue®.

2. Description of the Prior Art

In devices for the dosed supply of such liquids, use can be made of a certain pump type referred to as an orbital pump which is described, for example, in the German patent applications DE 10 2013 104 250 A1, DE 10 2013 104 245 A1, DE 10 2013 104 242 A1 and DE 10 2013 102 129 A1. A problem in the case of orbital pumps is that they are difficult to operate as dosing pumps. In the case of a dosing pump, the delivered amount of liquid is precisely settable and controllable on the basis of operating input variables of the pump (for example input current or input voltage or operating duration of the pump).

SUMMARY OF THE INVENTION

Against this background, it is the object of one aspect of the present invention to solve or at least to alleviate the highlighted problems of the prior art. It is intended in particular to propose an improved method for operating a device for the dosed supply of a liquid, wherein the device has, in particular, a pump of the orbital pump type.

The invention relates to a method for operating a device for the dosed supply of a liquid, wherein the device at least has at least one pump for delivering the liquid and at least one pressure sensor. The at least one pump has a pump housing with at least one inlet and at least one outlet, wherein an eccentric is arranged on the pump housing and wherein a deformable diaphragm is arranged between the pump housing and the eccentric, wherein the deformable diaphragm and the pump housing delimit at least one delivery path from the at least one inlet to the at least one outlet and form at least one seal of the delivery path, wherein the at least one seal is displaceable along the delivery path by way of a movement of the eccentric for the purpose of delivering the liquid. The at least one pressure sensor of the device is connected to the outlet of the pump. The method comprises here at least the following steps:
a) delivering liquid by way of the pump;
b) monitoring, during the delivery, a temporal pressure profile of the pressure at the outlet of the pump by way of the at least one pressure sensor;
c) establishing an angle position of the eccentric of the pump on the basis of at least one characteristic feature of the temporal pressure profile at the outlet.

In addition to the described pump (in particular an orbital pump), the device preferably has a tank in which the liquid is stored and from which the liquid is removed. Furthermore, the device preferably has an injector, by way of which the liquid delivered by the pump can be dosed into an exhaust-gas treatment device of an internal combustion engine. A line for delivering the liquid extends from the tank to the pump and from the pump to the injector, wherein the line section from the pump to the injector is also referred to as the pressure line.

In terms of type, the described pump may also be referred to as an orbital pump. Said pump type is described, for example, in the patent applications DE 10 2013 104 250 A1, DE 10 2013 104 245 A1, DE 10 2013 104 242 A1 and DE 10 2013 102 129 A1, and, in particular, these documents can be used for additional explanation. The movement of the at least one seal, or the movement of the eccentric, results in the movement of a movable pump volume in a delivery channel between the pump housing and the deformable diaphragm from the inlet of the pump to the outlet of the pump, such that liquid in the movable pump volume is delivered. As a result of the displaceable seal, the movable pump volume in the delivery path is likewise displaceable. The displaceable seal is substantially formed by the outer surface of the deformable diaphragm being pressed, in sections, by the eccentric against an inner surface of the pump housing. The deformable diaphragm is situated in a gap between the eccentric and the pump housing, which gap encircles the eccentric in a circumferential direction from the inlet to the outlet. In said gap, there is also positioned, between the pump housing and the deformable element, the delivery channel that connects the inlet and the outlet of the pump to one another.

The pressure sensor is connected to the outlet of the pump in such a way that a liquid pressure prevailing at the outlet can be measured by the pressure sensor.

Step a) relates to the normal delivery of liquid by way of the pump, that is to say the completely normal operation of the pump. Step a) can preferably also comprise a dosing operation in which the pump is used for dosing liquid. The monitoring of a temporal pressure profile of the pressure at the outlet, which takes place in step b), is preferably performed continuously in order, at any desired point in time, to be able to establish the characteristic features of the temporal profile of the pressure at the outlet, which are required in step c) for establishing the angle position.

Characteristic features may be various singularities in the temporal pressure profile, such as jumps, maxima, or minima of the temporal signal. Characteristic features of the pressure profile may in particular also be referred to as characteristic deviations or characteristic changes of the pressure signal. Characteristic features of the pressure signal allow, in particular, conclusions to be drawn concerning the angle position of the eccentric. The underlying reason for the establishment of an angle position of the eccentric on the basis of the characteristic features of the pressure signal is that, because of the rotation of the eccentric and the different angle position of the eccentric, a different ejection of liquid takes place at the outlet of the pump. For example, there is a certain angle position in which a pump volume inside the delivery path is connected to the outlet for the first time. In some circumstances, this then results in a backflow of liquid from the outlet back into the pump or into the movable pump volume. Said backflow leads to a characteristic feature of the temporal profile of the pressure at the outlet. It has proven to be advantageous to use such characteristic features of the pressure profile to determine an angle position of the eccentric of the pump.

The method is furthermore advantageous if an angle position of the eccentric is established in step c) on the basis of an abrupt pressure drop, determined by the pressure sensor, as a characteristic feature of the temporal pressure profile. An abrupt pressure drop arises, for example, as a result of the above-described situation, when the outlet of the pump is connected for the first time to a movable pump volume inside the delivery path of the pump. Liquid then flows from the outlet back into the delivery path inside the pump. Consequently, the pressure at the outlet drops. This effect can be detected as an abrupt pressure drop. If appropriate, it is also possible to use not the abrupt pressure drop, but rather a pressure minimum, which results on account of the pressure dropping abruptly and subsequently rising again, as a characteristic feature of the pressure profile. Such an abrupt pressure drop suggests that the angle position of the eccentric is precisely in the vicinity of the inlet and, accordingly, a displaceable seal moved past the outlet shortly beforehand. For this reason, at this point in time, the first connection between a pump volume inside the delivery path and the outlet is realized.

The method is furthermore advantageous if an angle position of the eccentric is determined in step c) on the basis of a pressure peak, determined by the pressure sensor, as a characteristic feature of the temporal pressure profile.

After the pressure, during the first connection of a pump volume in the delivery path to the outlet, has dropped, a rise in pressure at the outlet results on account of the further movement of the eccentric and the resulting further displacement of the seal. This rise leads to a pressure peak or a pressure maximum. This pressure peak, or this pressure maximum, can be analyzed as a characteristic feature for detecting an angle position of the eccentric.

According to a particularly advantageous configuration, both an abrupt pressure drop and a pressure peak following the abrupt pressure drop temporally are used in combination to thereby identify an angle position of the eccentric. This happens, for example, in that, after the occurrence of an abrupt pressure drop, a pressure peak that follows this directly is awaited, and this pressure peak is then used as a characteristic feature in order to establish an angle position of the sensor. The abrupt pressure drop is then a type of upstream criterion such that, as a result of the joint consideration of an abrupt pressure drop and a pressure peak, there is greater reliability in determining a present angle position of the eccentric in a really precise manner.

The method is furthermore advantageous if a mean pressure level, which prevails at the pressure sensor, is taken into consideration during the analysis of the characteristic feature in step c).

In the pressure line section between the sector and the pump, there is normally a dependency between the volume filled with liquid in said pressure line section and the prevailing pressure. This means, in particular, that the pressure in the pressure line section at the outlet of the pump is not built up abruptly, but the pump initially has to deliver liquid before the pressure is generated there. This can therefore result in different pressure levels at the outlet. It has emerged that characteristic features of the pressure signal, which are analyzed during step c), can differ in degree according to the pressure level. It is therefore advantageous to take the mean pressure level at the outlet into consideration.

The method is furthermore advantageous if the steps a), b) and c) are carried out temporally in parallel with one another. It has already been described further above that the delivery of liquid by way of the pump in step a) relates to the normal delivery of liquid by way of the pump. It is particularly advantageous if the monitoring and the establishment of the angle position according to the method steps b) and c) are carried out permanently and continuously during the entire delivery operation of the pump according to step a). Particularly high reliability is then provided for always knowing the angle position of the eccentric precisely.

The method is furthermore advantageous if the method step c) is carried out only if a mean pressure level, prevailing at the pressure sensor, is above a threshold pressure.

In some circumstances, the described characteristic features of the pressure signal are not present at all or are only very weakly pronounced if the pressure level at the outlet is low (below a threshold pressure). For example, the backflow effect described above, which leads to an abrupt pressure drop, cannot be registered if the pressure level at the outlet is very low. It is therefore advantageous to carry out the method only under the condition that actually characteristic features of the pressure profile are also present, which features are suitable for precisely establishing an angle position of the eccentric. This can be achieved through the described consideration of a threshold pressure.

The method is furthermore advantageous if the at least one outlet of the at least one pump is adjoined by a pressure line that leads to an injector for the dosed dispensing of the liquid, and wherein the pressure sensor is arranged on this pressure line and is set up to measure the pressure in the pressure line.

The pressure sensor is preferably arranged very close to the outlet to measure very precisely the described pressure effects that result on account of the properties of the pump at the outlet. In some circumstances, said pressure effects are subject to distortion, which results due to variations in the liquid volume that exist between the outlet of the pump and the pressure sensor. If the pressure sensor is arranged close to the outlet, said liquid volume is small, and this also reduces the distortion that occurs.

In some circumstances, it can, however, also be advantageous to arrange the pressure sensor further away (spatially) from the outlet of the pump and relatively close to an injector. If appropriate, the pressure sensor there is also suitable for identifying the required characteristic features of the pressure signal. At the same time, however, the pressure sensor can still be used to monitor the pressure prevailing at the injector for dosing of liquid by way of the injector. In this context, it is particularly advantageous if the influence of variations in the liquid volume between the pressure sensor and the outlet is taken into consideration, in order to establish the one connection between the characteristic features of the pressure profile and the angle position of the eccentric. This can occur, for example, in the form of characteristic maps which specify this connection with cross-influence variables taken into consideration. Here, cross-influence variables are in particular cross-influences on the said liquid volume between the outlet and the pressure sensor, for example the delivery speed, the pressure level, etc.

The method is furthermore advantageous if the at least one outlet of the pump is adjoined by a pressure accumulator and an injector, and the pump delivers the liquid into the pressure accumulator, wherein the amount of liquid dispensed by the device is adjustable via the pressure accumulator and the opening time of the injector.

In this context, it is particularly advantageous if pressure variations in the pressure accumulator are detected with the aid of the pressure sensor and are taken into consideration during the dosing via the opening time of the injector. The pressure accumulator is preferably formed by the pressure line, already described, from the injector to the pump. Said pressure line may for example be of elastic design, such that it acts as a pressure accumulator.

The method is furthermore advantageous if the pump has at least one Hall sensor by way of which a change in angle position of the eccentric can be detected, wherein the method further comprises the following step:

d) determining a changed angle position, starting from the angle position determined in step c), on the basis of the change in angle position established by way of the Hall sensor.

The pump may have an electrical drive designed with an electric motor. An electric motor normally has a stator with electromagnets, and a rotor, wherein the rotor may be designed either likewise with electromagnets or with permanent magnets. The described Hall sensors are preferably arranged on or in the electrical drive of the pump. The detection of a change in angle position of the eccentric with the aid of the Hall sensors is based, for example, on changes in the electromagnetic field at the electrical drive, which result from the movement of the rotor of the electrical drive and which, due to the movement of the eccentric and of the drive of the pump, lead to fluctuations of a current measured at the Hall sensor or of a voltage generated at the Hall sensor. However, this detection with the aid of the Hall sensor allows only changes in angle position to be established. An absolute determination of the angle position of the eccentric is not thereby possible. This applies, in particular, if the precise installation position, relative to the eccentric, of the rotor or of the electrical drive is not known. However, it is possible, starting from the angle position determined according to method step c), to determine changes in angle position by way of the Hall sensors, and thereby to indirectly detect any angle positions precisely. It is then possible not only to precisely detect angle positions which are detectable on the basis of a characteristic feature of the pressure profile. A complete resolution of the angle position of the eccentric for any desired position is thus possible. This would not be realizable by the characteristic feature of the pressure profile alone, because characteristic features of the pressure profile which are suitable for establishing an angle position only arise at very specific angle positions of the eccentric.

The method is furthermore advantageous if the establishment of an angle position of the eccentric of the pump on the basis of at least one characteristic feature of the temporal pressure profile takes place in dependence on a prevailing rotational speed of the eccentric of the pump.

The characteristic features of the temporal pressure profile differ in degree according to the magnitude of a rotational speed of the eccentric of the pump. It is therefore advantageous for the rotational speed of the eccentric to be additionally taken into consideration, in order to allow higher precision of the determined angle position in step c). The influence of the rotational speed of the eccentric is related, in particular, to flow effects of the liquid inside the pump, said effects forming differently at different rotational and delivery speeds of the pump.

BRIEF DESCRIPTION OF THE DRAWINGS

The invention and the technical field will be explained in more detail below on the basis of the figures. The figures show particularly preferred exemplary embodiments, to which the invention is, however, not restricted. It is pointed out in particular that the figures, and in particular the dimensional relationships illustrated in the figures, are merely schematic. In the figures.

DETAILED DESCRIPTION OF THE PRESENTLY PREFERRED EMBODIMENTS

Figure 1:
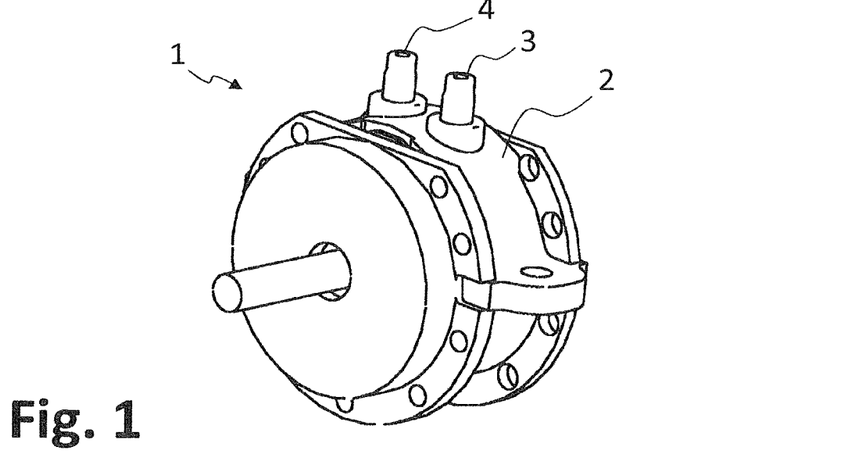
FIG. 1 is a pump configured as an orbital pump.

FIG. 1 shows in an isometric view a described pump 1 for the described method and for a described device, having a pump housing 2, an inlet 3 and an outlet 4. The pump 1 illustrated in FIG. 1 is illustrated in section in FIG. 2. The pump housing 2 with the inlet 3 and the outlet 4 can likewise be seen. In the pump housing 2, the eccentric 5 is arranged to be rotatable. In a gap 11 between the eccentric 5 and the pump housing 2, there is a deformable diaphragm 7 and the delivery path 8, which is delimited by an outer surface 23 of the deformable diaphragm 7 and an inner surface 6 of the pump housing 2. The deformable diaphragm 7 is pressed, in sections, by the eccentric 5 against an inner surface of the pump housing 2, such that an outer surface 23 of the deformable diaphragm bears against the pump housing 2. There is thus formed a displaceable seal 9, which is displaceable by way of a rotation of the eccentric in a direction of delivery from the inlet 3 to the outlet 4. The direction of delivery is also reversible by changing the direction of rotation of the eccentric 5. An angle position 13 of the eccentric 5 is defined, for example, by the position of the narrowest point in the gap 11 between the eccentric 5 and the pump housing 2. The displaceable seal 9 is normally also situated at said point, referred to as the angle position 13.

Figure 2:
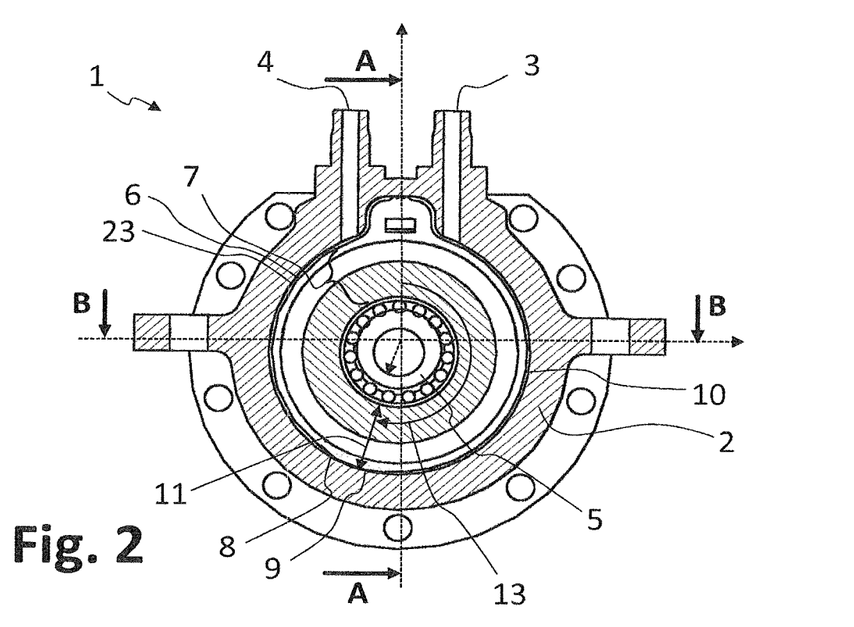
FIG. 2 is a section through the pump.
Figure 3:
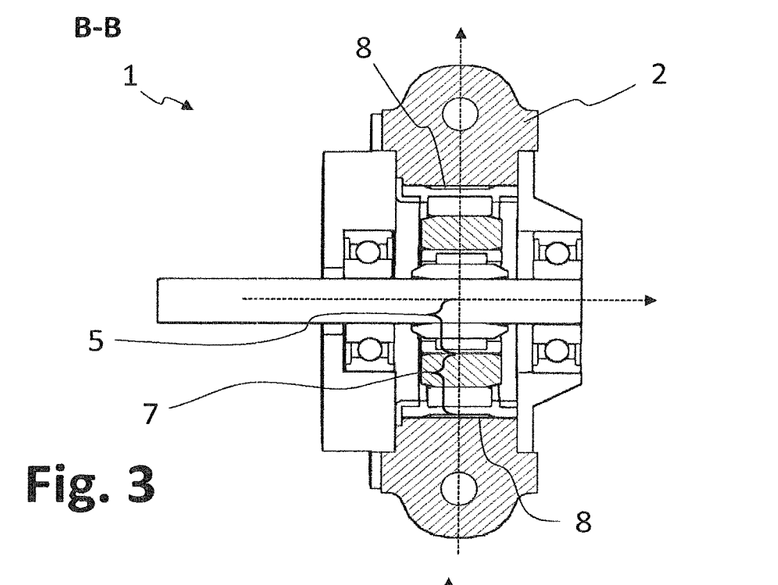
FIG. 3 is a further section through a pump.

FIG. 3 shows the section B-B, marked in FIG. 2, through the pump 1. The pump housing 2, the eccentric 5, the deformable diaphragm 7, and also the delivery path 8 can be seen.

Figure 4:
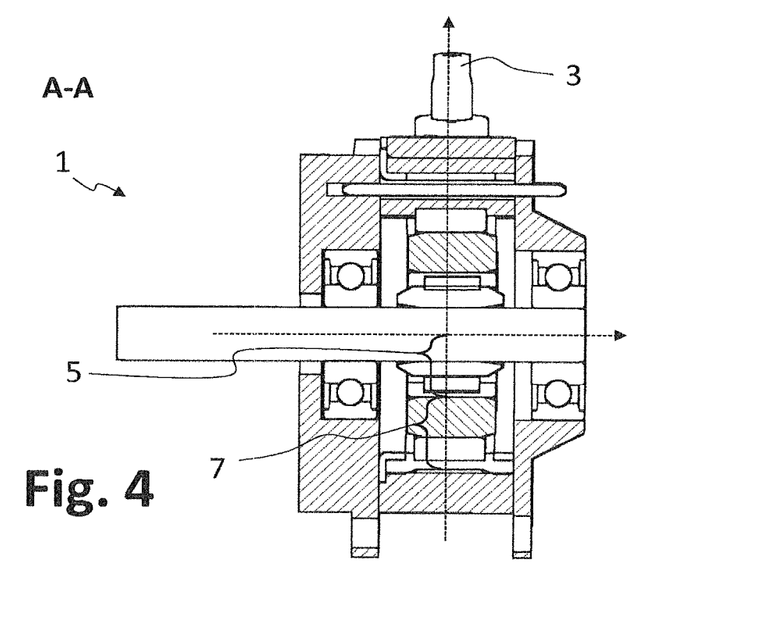
FIG. 4 is yet another section through a pump.

FIG. 4 correspondingly shows the section marked with A-A through the pump 1.

Figure 5:
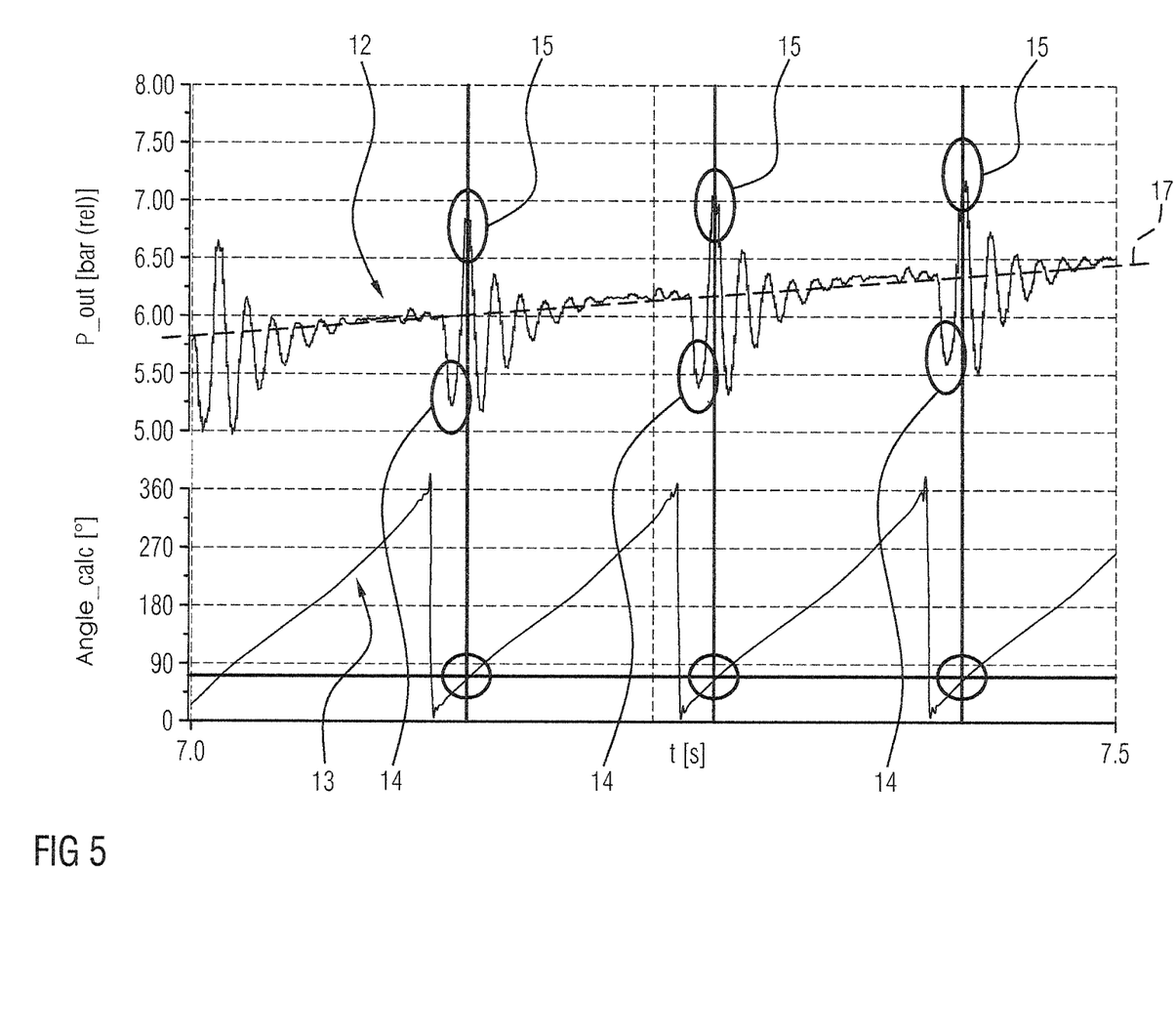
FIG. 5 is a first diagram of a pressure profile.

FIG. 5 illustrates in a diagram the temporal pressure profile 12 and, in parallel with the temporal pressure profile 12, the angle position 13 of the eccentric of the pump. Characteristic features of the pressure profile, in particular an abrupt pressure drop 14 and a pressure peak 15, can be seen. It can be seen how, on the basis of these characteristic features of the pressure profile, an angle position 13 of the eccentric can be established, because certain characteristic features of the pressure profile 12 always arise at certain angle positions 13 of the eccentric. A mean pressure profile 17 at the outlet is likewise illustrated. The characteristic features are visible as deviations from said mean pressure level.

Figure 6:
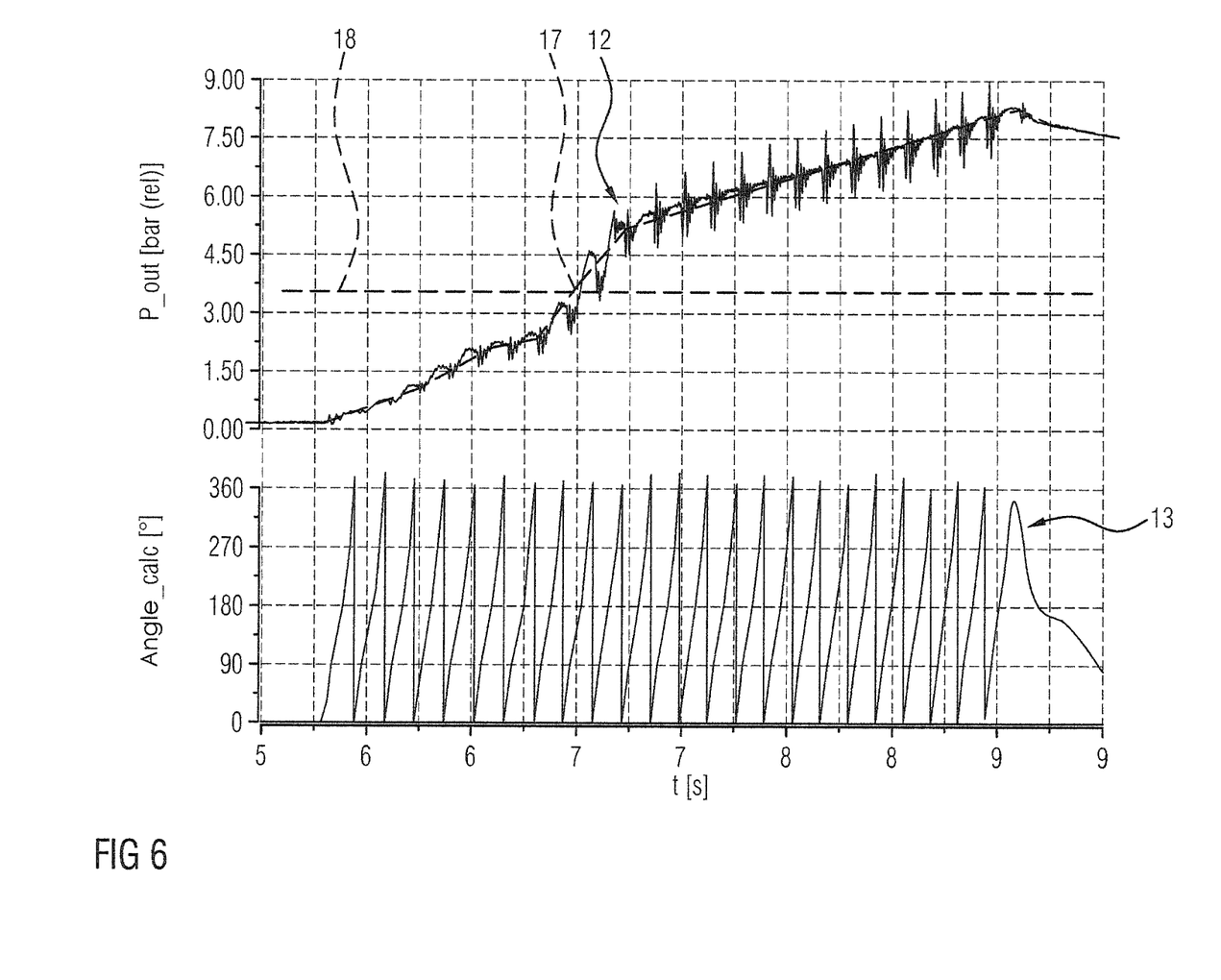
FIG. 6 is a second diagram of a pressure profile.

FIG. 6 is a further diagram in which the pressure profile 12 and the angle position 6 are illustrated. A mean pressure level 17, which rises continuously in the diagram according to FIG. 6, can be seen here. Only if the mean pressure level 17 has exceeded a threshold pressure 18 are characteristic features of the pressure profile 12 sufficiently pronounced such that it is possible to establish the angle position 13 on the basis of the characteristic features of the pressure profile 12.

Figure 7:
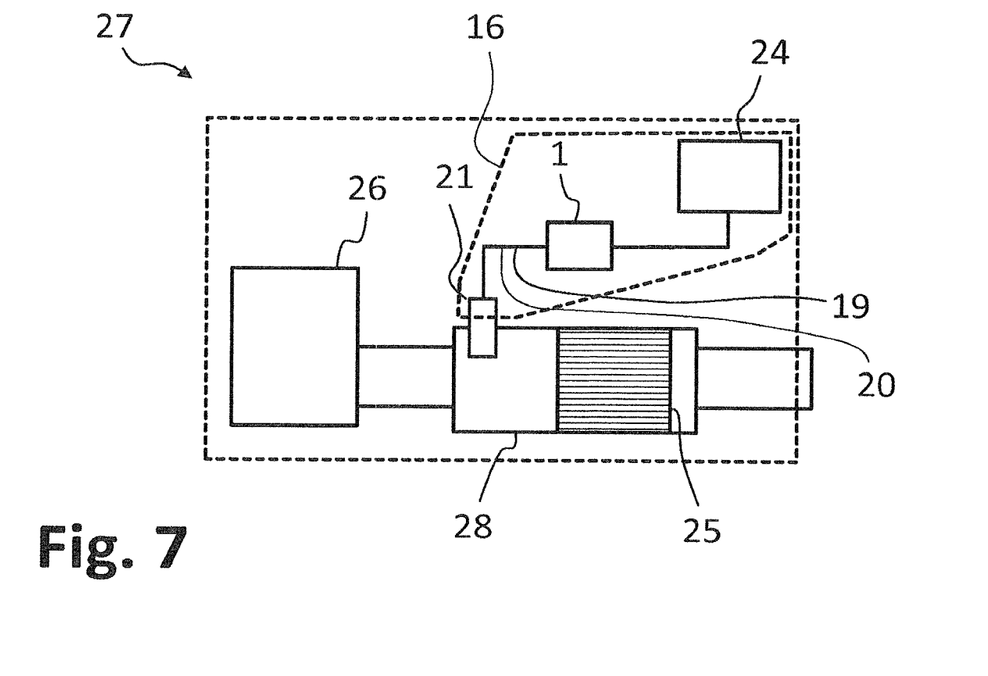
FIG. 7 is a motor vehicle having a device with a pump.

FIG. 7 shows a motor vehicle 27 having an internal combustion engine 26 and an exhaust-gas treatment device 22 with an SCR catalytic converter 25 for cleaning the exhaust gases of the internal combustion engine 26. A liquid additive for exhaust-gas cleaning can be fed to the exhaust-gas treatment device 22 by way of a device 16. For this purpose, the device 16 has a pump 1, a tank 24 in which the liquid is stored, and also an injector 21 by way of which the liquid can be fed to the exhaust-gas treatment device 22. The pump 1 and the injector 21 are connected to one another via a pressure line 19 formed as a pressure accumulator 20.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device for a dosed supply of a liquid, at least having
   at least one pump configured to deliver the liquid, the at least one pump having a pump housing defining a generally circular space with at least one inlet and at least one outlet, wherein an eccentric is coaxially arranged inside the pump housing and a deformable diaphragm is coaxially arranged between the pump housing and the eccentric, wherein the deformable diaphragm and the pump housing delimit at least one generally circular delivery path from the at least one inlet to the at least one outlet and form at least one seal of the at least one delivery path, wherein the at least one seal is displaceable along the at least one delivery path by way of a movement of the eccentric to deliver the liquid, and at least one pressure sensor connected to the at least one outlet of the pump, wherein the method comprises:
   a) delivering the liquid using the at least one pump;
   b) monitoring, during the delivery, a temporal pressure profile at the at least one outlet of the pump using the at least one pressure sensor; and
   c) establishing an angle position of the eccentric along the generally circular delivery path of the at least one pump based at least in part on at least one characteristic feature of the temporal pressure profile at the at least one outlet.

2. The method as claimed in claim 1, wherein the angle position of the eccentric is established based on an abrupt pressure drop, determined by the at least one pressure sensor, as the at least one characteristic feature of the temporal pressure profile.

3. The method as claimed in claim 1, wherein the angle position of the eccentric is determined based on a pressure peak, determined by the at least one pressure sensor, as the at least one characteristic feature of the temporal pressure profile.

4. The method as claimed in claim 1, wherein a mean pressure level, which prevails at the at least one pressure sensor, is taken into consideration during an analysis of the at least one characteristic feature in c).

5. The method as claimed in claim 1, wherein a), b), and c) are carried out temporally in parallel with one another.

6. The method as claimed in claim 4, wherein c) is carried out only if a mean pressure level prevailing at the at least one pressure sensor is above a threshold pressure.

7. The method as claimed in claim 1, wherein the at least one outlet of the at least one pump is adjoined by a pressure line that leads to an injector for the dosed dispensing of the liquid, and wherein the at least one pressure sensor is arranged on the pressure line and is configured to measure the pressure in the pressure line.

8. The method as claimed in claim 1, wherein the at least one outlet of the pump is adjoined by a pressure accumulator and an injector, and the pump delivers the liquid into the pressure accumulator, wherein an amount of liquid dispensed by the device is adjustable via the pressure in the pressure accumulator and an opening time of the injector.

9. The method as claimed in claim 1, wherein the pump has at least one Hall sensor by which a change in angle position of the eccentric can be detected, wherein the method further comprises:
   d) determining the change in angle position, starting from the angle position determined in c), based on a change in angle position established by the at least one Hall sensor.

10. The method as claimed in one claim 1, wherein the establishment of the angle position of the eccentric of the pump based at least in part on the at least one characteristic feature of the temporal pressure profile takes place based on a prevailing rotational speed of the eccentric of the pump.

* * * * *